Patented Nov. 3, 1936

2,059,232

UNITED STATES PATENT OFFICE 2,059,232

RECOVERY OF FATTY ACIDS FROM OXIDATION PRODUCTS

Max Harder, Oppau, Germany, assignor to I. G. Farbenindustrie Aktiengesellschaft, Frankfort-on-the-Main, Germany No Drawing. Application October 30, 1934, Serial No. 750,672. In Germany November 3, 1933

8 Claims. (Cl. 260—122)

The present invention relates to a process of recovering fatty acids from oxidation products.

Usually the fatty acids obtained from the oxidation products of from liquid to solid non-aromatic hydrocarbons, i. e. open chain aliphatic or cycloaliphatic hydrocarbons, for example paraffin wax, scale wax, middle oils and the like, are contaminated with substances which possess a disagreeable odor and the acid number and saponifying number of which show a considerable difference. These substances are in part insoluble in petroleum ether and consist of lactones, lactides, estolides, ester acids and the like. Their presence is indicated by the high ester number of the acid oxidation products even if these do not contain ordinary esters. The compounds mentioned cause the formation of resinous and pitch-like matter in the distillation of the crude fatty acids and thereby substantial waste of valuable material.

I have now found that carboxylic acids substantially free from the said undesired contaminations can be obtained from the oxidation products of higher molecular from liquid to solid non-aromatic hydrocarbons by heating the crude or pretreated oxidation products in the presence of alkaline reacting agents at temperatures above 260° C., preferably at about 320° C. in the presence of substances which develop hydrogen in alkaline media; the said treatment can be effected during or after the saponification.

Suitable initial materials are for example products obtainable by oxidizing by means of gases comprising oxygen (such as air or oxides of nitrogen) or nitric acid or the like, paraffin wax, paraffin oil, ceresine, higher boiling mineral oil fractions, such as middle oils, or naphthene hydrocarbons such as Russian gas oil, or synthetically produced oils such as those obtainable by the hydrogenation of coal, tar and the like. The acid constituents of these oxidation products are converted into soaps by treatment with alkaline reacting agents, such as alkali lyes or solutions of alkali carbonates.

The process may be carried out for example by raising the temperature during the saponification up to above 260° C. and heating the mixture for a longer period at the said temperature while adding zinc dust or the like. The temperature to be employed and the period of reaction depend upon the nature and the amount of the initial materials; in some cases it is sufficient to treat the material for 1 hour. It is also possible to saponify the oxidation product in the usual manner, i. e. at lower temperatures, whereupon the unsaponifiable oxidation products are separated from the soap solution; the latter is then subjected to the treatment described above. The process is preferably carried out in the presence of water either in a discontinuous manner in a closed stirring or revolving autoclave or in a continuous manner in a closed system of pipes or worms. The most favorable temperatures are at about 320° C.

Suitable substances capable of developing hydrogen in alkaline media are for example zinc dust, aluminium powder and the like. The favorable action of these additions may be still improved by forcing hydrogen into the reaction space. In the latter case it is usually of advantage to add hydrogenation catalysts such as finely divided nickel, copper, cobalt and the like.

Soap solutions of high value are obtained in the manner described, if desired after separating the unsaponifiable components (which may be effected for example by extraction with solvents or by distillation). By evaporating the soap solutions to dryness anhydrous soaps are obtained which do no longer possess the unpleasant odor originally present; the soaps are very fast to storing and may be directly employed for the production of marketable soaps. The fatty acids obtainable from the soap solutions by acidification are practically free from lactones, estolides, lactides and the like. They possess a higher melting point than the non-treated carboxylic acids, are practically free from odor and lightly colored; their acid number and saponification number are practically the same; the acids may be distilled in a much more satisfactory manner.

Also that part of the material which contains the unsaponifiable components is purified to a fargoing degree by the present process; while this part when prepared according to the methods hitherto known has a small saponification number its saponification number is zero in the present process while the amount of carboxylic acids contained in that part which contains the saponifiable components is higher by about the corresponding amount. The valuable compounds in the unsaponifiable part which contain hydroxyl and carbonyl groups are not decomposed in the present process. In many cases their amount is even slight increased.

The following examples will further illustrate the nature of this invention but the invention is not restricted to these examples. The parts are by weight.

*Example 1*

A product obtained by oxidizing hard paraffin wax with air at about 150° C. in the presence of a manganese catalyst according to the process of the German Patent No. 405,850 is saponified in a 20 per cent aqueous solution by means of sodium hydroxide which latter is employed in an excess of 5 per cent of the amount theoretically necessary for the saponification of the acid components. The saponification requires about ½ hour. The amount of sodium hydroxide theoretically necessary is calculated by means of the saponification number. 0.5 per cent of zinc dust is added and the saponification product is then heated for from 4 to 6 hours at about 300° C. in an autoclave while stirring whereby the pressure rises to 150 atmospheres. After cooling down to an internal temperature of 70° C. the pressure in the autoclave is released and the latter is discharged. The removal of the unsaponifiable components is effected by extracting the reaction product three times with benzine with the addition of small amounts of isopropyl alcohol. The soap solution is acidified with dilute sulphuric acid whereby crude acids are obtained which are essentially better than those obtainable in the usual manner, i. e. at relative low temperatures and without the addition of zinc dust. This can be seen from the following table.

|  | Acid number | Saponific. number | Insoluble in petroleum ether (%) | Residue from steam-distillation (%) |
|---|---|---|---|---|
| Usual saponific. product | 180 | 230 | 6 | 20 |
| Saponific. product accord. to present process | 222 | 228 | 0 | 6 |

The part insoluble in petroleum ether comprises substantially hydroxy acids, ester acids, estolides, lactides and the like.

*Example 2*

A product obtained by oxidizing paraffin oil with air at 150° C. in the presence of a manganese catalyst according to the process of the German Patent No. 405,850 is treated in a 15 per cent aqueous solution with sodium hydroxide for about 6 hours at from 290° to 300° C. with the addition of 1 per cent of zinc dust, the sodium hydroxide being employed in an excess of 5 per cent of the amount theoretically necessary for the saponification of the acid components. After extraction of the unsaponifiable components in the manner described in Example 1 and subsequent precipitation of the fatty acids with dilute sulphuric acid and steam-distillation a product is obtained which possesses the following characteristics.

Acid number_____ 209
Saponification number_____ 219
Distillation residue_____per cent__ 18

The corresponding characteristics of a product obtained by treating the same oxidation product in the hitherto usual manner with alkalies at lower temperature without the addition of zinc dust are as follows:

Acid number_____ 166
Saponification number_____ 226
Distillation residue_____per cent__ 35

*Example 3*

1000 parts of a product obtained in the usual manner from an oxidation product from hard paraffin by saponification with sodium hydroxide solution at 150° C. and subsequent extraction of the soap solution (which product has a saponification number of 20) are heated with 15 parts of sodium hydroxide in a 10 per cent aqueous solution with the addition of 4 parts of zinc dust for 3 hours at 300° C. while stirring. After removing the unsaponified parts by extraction with methyl alcohol 40 parts of good crude acids are obtained which have the saponification number 190 and the acid number 185. The characteristics of the unsaponifiable product are as follows:

Carbonyl number_____ 50
Hydroxyl number_____ 28
Saponification number_____ 0

If the same initial material is treated with alkali lye at lower temperatures and without the addition of zinc dust, a product of the following characteristics is obtained:

Carbonyl number_____ 50
Hydroxyl number_____ 30
Saponification number_____ 20

*Example 4*

A product obtained by oxidizing hard paraffin wax with air at 160° C. in the presence of 1 per cent of sodium carbonate is saponified for 3 hours at 290° C. in an autoclave with a 25 per cent aqueous solution of sodium hydroxide, the latter being employed in an excess of 5 per cent of the amount theoretically necessary for the saponification. The saponification product is worked up in the manner described in Example 1 whereby a crude product of the following characteristics is obtained:

Acid number _____ 228
Saponification number_____ 238
Distillation residue_____per cent__ 20

Also in this case it is advantageous to work in the presence of zinc dust, aluminium powder or the like.

If the same oxidation product is saponified in the manner hitherto usual a product is obtained which has the following characteristics:

Acid number _____ 185
Saponification number_____ 238
Distillation residue_____per cent__ 30

What I claim is:—

1. The process of recovering carboxylic acids from the oxidation products of from liquid to solid, non-aromatic hydrocarbons which comprises heating the said oxidation products in the presence of an alkaline reacting agent, of water, and of an agent developing hydrogen in alkaline media at a temperature of about 320° C.

2. The process of recovering carboxylic acids from the oxidation products of from liquid to solid, non-aromatic hydrocarbons which comprises heating the said oxidation products for a prolonged time in the presence of an alkaline reacting agent, of water, and of an agent developing hydrogen in alkaline media at a temperature above 260° C.

3. The process of recovering carboxylic acids from the oxidation products of from liquid to solid, non-aromatic hydrocarbons which comprises heating the said oxidation products in the presence of an alkaline reacting agent, of water and of an agent developing hydrogen in alkaline media at a temperature above 260° C.

4. The process of recovering carboxylic acids from the oxidation products of from liquid to solid, non-aromatic hydrocarbons which comprises heating the said oxidation products in a closed vessel in the presence of an alkaline reacting agent, of water and of an agent developing hydrogen in alkaline media at a temperature above 260° C.

5. The process of recovering carboxylic acids from the oxidation products of from liquid to solid, non-aromatic hydrocarbons which comprises saponifying the said oxidation products and then heating them in a closed vessel in the presence of an alkaline reacting agent, of water and of an agent developing hydrogen in alkaline media at a temperature above 260° C.

6. The process of recovering carboxylic acids from the oxidation products of from liquid to solid, non-aromatic hydrocarbons which comprises saponifying the said oxidation products, heating them in a closed vessel in the presence of an alkaline reacting agent, of water and of an agent developing hydrogen in alkaline media at a temperature above 260° C., separating the non-saponified part from the saponified part and setting free the acids from the latter.

7. The process of recovering carboxylic acids from the oxidation products of from liquid to solid, non-aromatic hydrocarbons which comprises saponifying the said oxidation products, separating the non-saponified part from the saponified part and heating the latter in a closed vessel in the presence of an alkaline reacting agent, of water and of an agent developing hydrogen in alkaline media at a temperature above 260° C.

8. The process of recovering carboxylic acids from the oxidation products of from liquid to solid, non-aromatic hydrocarbons which comprises heating the said oxidation products in the presence of an alkaline reacting agent, of water, and of an agent developing hydrogen in alkaline media at a temperature above 260° C., separating the non-saponified part from the saponified part and setting free the acids from the latter.

MAX HARDER.